United States Patent
Proctor et al.

(10) Patent No.: US 10,755,186 B2
(45) Date of Patent: Aug. 25, 2020

(54) PLUGGABLE KNOWLEDGE TYPES IN A RULE ENGINE

(71) Applicant: Red Hat, Inc., Raleigh, NC (US)

(72) Inventors: Mark Proctor, London (GB); Mario Fusco, Milan (IT)

(73) Assignee: Red Hat, Inc., Raleigh, NC (US)

( * ) Notice: Subject to any disclaimer, the term of this patent is extended or adjusted under 35 U.S.C. 154(b) by 1037 days.

(21) Appl. No.: 15/245,534

(22) Filed: Aug. 24, 2016

(65) Prior Publication Data
US 2017/0061289 A1 Mar. 2, 2017

Related U.S. Application Data

(60) Provisional application No. 62/210,316, filed on Aug. 26, 2015.

(51) Int. Cl.
*G06N 5/02* (2006.01)
*G06N 7/00* (2006.01)
*G06F 9/50* (2006.01)

(52) U.S. Cl.
CPC .......... *G06N 7/005* (2013.01); *G06F 9/5055* (2013.01); *G06F 2209/509* (2013.01)

(58) Field of Classification Search
CPC .. G06F 2209/509; G06F 9/5055; G06N 7/005
USPC ....................................................... 717/120
See application file for complete search history.

(56) References Cited

U.S. PATENT DOCUMENTS

| | | | |
|---|---|---|---|
| 2007/0027674 A1* | 2/2007 | Parson ................. | G06F 17/271 704/9 |
| 2009/0063382 A1* | 3/2009 | Proctor ................. | G06N 5/025 706/47 |
| 2009/0265288 A1* | 10/2009 | Chakravarty .......... | G06N 5/022 706/11 |
| 2012/0233668 A1* | 9/2012 | Leafe .................. | G06F 9/44526 726/4 |
| 2012/0233688 A1* | 9/2012 | Tonouchi .............. | H04W 48/20 726/17 |
| 2013/0263120 A1* | 10/2013 | Patil .................... | G06F 9/45558 718/1 |
| 2014/0082169 A1* | 3/2014 | Shinde ............. | H04N 21/25883 709/223 |
| 2014/0101665 A1* | 4/2014 | Mousseau ............. | G06F 9/5072 718/104 |
| 2014/0122143 A1* | 5/2014 | Fletcher ............. | G06Q 10/0631 705/7.14 |
| 2015/0067176 A1* | 3/2015 | Dubois .................. | H04L 69/08 709/227 |

(Continued)

*Primary Examiner* — John Q Chavis
(74) *Attorney, Agent, or Firm* — Lowenstein Sandler LLP

(57) ABSTRACT

Systems and methods for allowing pluggable knowledge types to be discovered, registered, and added to a rule engine are disclosed. An example method may include retrieving, by a processing device executing a rule engine, a list of pluggable services associated with a specified knowledge type; identifying a first pluggable service on the list of pluggable services; identifying one or more knowledge types that the first pluggable service is configured to process, wherein the one or more knowledge types comprise the specified knowledge type; and indexing, by the processing device, the first pluggable knowledge in the service registry by information identifying the one or more knowledge types.

20 Claims, 14 Drawing Sheets

(56) References Cited

U.S. PATENT DOCUMENTS

2015/0074259 A1* 3/2015 Ansari .................. H04L 67/02
709/224

* cited by examiner

PLUGGABLE KNOWLEDGE TYPES IN A RULE ENGINE

CROSS REFERENCE TO RELATED APPLICATION

This application claims the benefit of U.S. Provisional Application No. 62/210,316, filed on Aug. 26, 2015, the entirety of which is incorporated by reference herein.

TECHNICAL FIELD

The disclosure is generally related to rule engine management, and is more specifically related to discovering, registering, and adding different pluggable knowledge types for processing by a rule engine.

BACKGROUND

Knowledge representation is an area relating to how knowledge is represented and manipulated. Systems use knowledge representation to facilitate the codification of knowledge into a knowledge base. Knowledge base systems typically require different types of logic to model different parts of a problem. The knowledge base may be of a specific type that is tied to a particular type of a reasoning engine configured to apply rules to data provided by the knowledge base. Currently, adding data to a knowledge base is done by hard coding the data as part of the core kernel code base.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1A:
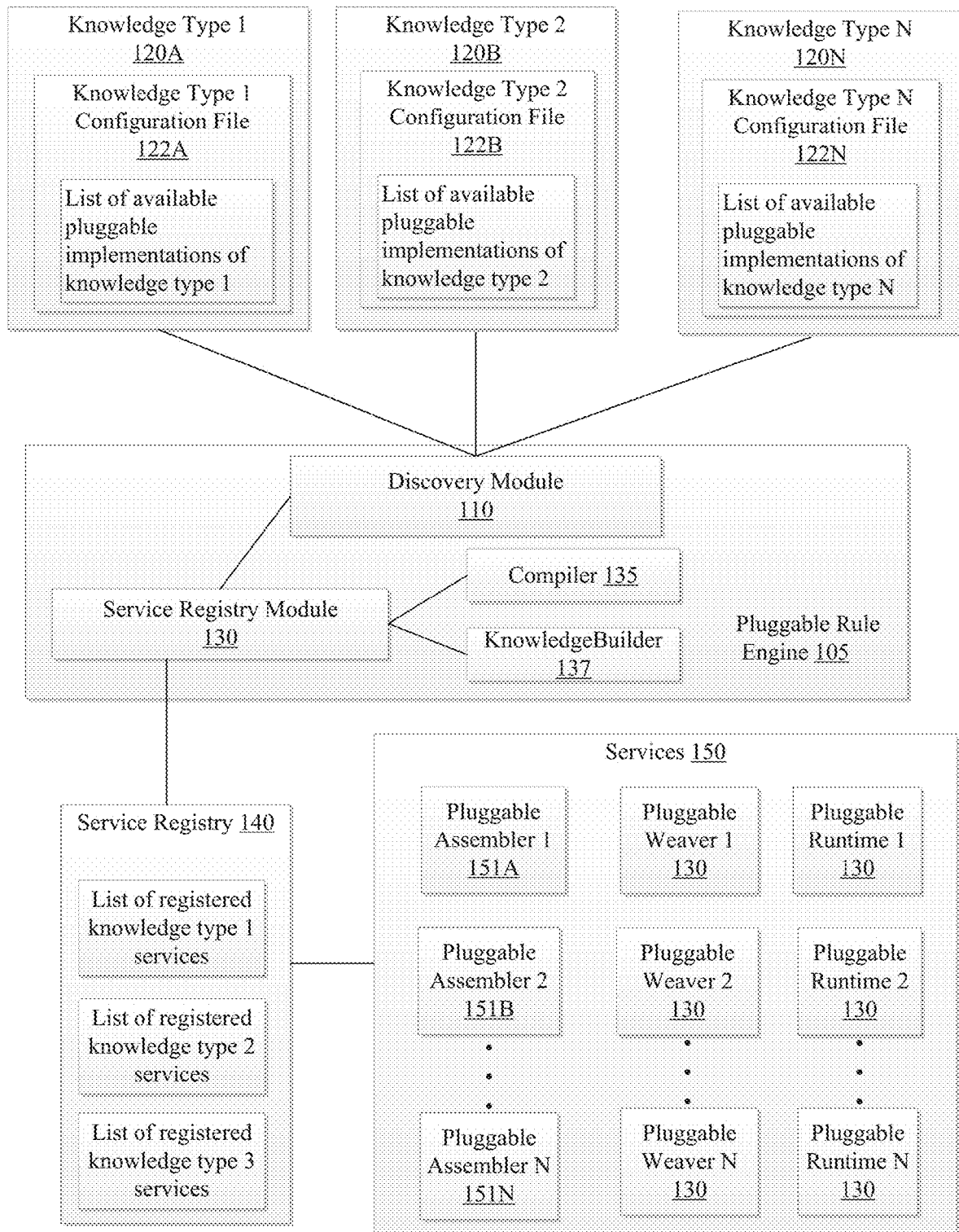
FIG. 1A depicts a high-level diagram of an example system architecture for a pluggable rule engine operating in accordance with one or more aspects of the disclosure.

A business rule engine is a system configured to execute one or more business rules in a production environment. Typically, the rule engine is provided as a component of a rule management system configured to register, define, classify and manage the rules and associated rule definitions. Conventional rule engines typically have a number of types of resources that the rule engine is able to compile, i.e. transform into knowledge packages that are executable by the engine at runtime. For example, a conventional rule engine may define knowledge types through resource files expressed with a technical language specific to the rule engine itself, such as in the form of decision tables in a spreadsheet format or decision trees in a hierarchical format (e.g., extensible markup Language (XML)). In a typical system, the various knowledge types processed by the system are hard-coded in the core kernel. This results in a system that includes a robust core kernel that is rigid and inflexible, such that the coupling of various knowledge types requires coding efforts. In this regard, hard coding the core kernel creates problems when multiple different reasoning engines using various knowledge base types interoperate with one another.

Aspects of the present disclosure address the above and other deficiencies by providing methods and systems that allow different pluggable knowledge types to be discovered, registered, and added to a rule engine, whereby the knowledge types are decoupled from the core kernel and may be optionally added to a minimal core kernel. A knowledge base system may be configured to process various different types of logic (i.e., knowledge types such as workflows, rules, and bayesian belief networks (BBN)) to model different parts of a problem (e.g., a business rules related problem) that are otherwise extremely difficult, time-consuming, and expensive to solve. The knowledge types may work independently, or have integration points that allow one knowledge type to use one or more other knowledge types (e.g., one knowledge type may use the result of another knowledge type). For example, a workflow (e.g., a first knowledge type) may determine when one or more rules (e.g., a second knowledge type) are allowed to be applied, executed, or triggered. In another example, a BBN (knowledge type 3) can be applied to a set of logical inferences, rules, principles, or relationships to determine a degree of confidence associated with a particular fact (e.g., a quantity that may be assigned to represent a state of belief associated with the occurrence of an event).

In an implementation, a system including a pluggable rule engine (PRE) is provided that allows different knowledge types to be decoupled from a core kernel of the PRE and optionally added to the PRE when needed. According to some aspects of the present disclosure, by de-coupling the knowledge types from the core kernel, a first knowledge type that has optional functionality dependent on second knowledge type, is able to continue to run, even if the second knowledge type is unavailable. In an example, a 'workflow' knowledge type may execute without a corresponding 'rules' knowledge type, provided the 'workflow' knowledge type does not attempt to invoke a rule part of a rule application program interface (API) from the workflow).

The PRE is an application that discovers, registers, and manages multiple different knowledge types and related services (e.g., assemblers, weavers, runtimes, etc.) implemented by each of the knowledge types. In an implementation, an assembler service is configured to compile a resource (e.g., a file) encoded in a specific format associated with a knowledge type to be processed into a resource package. In one example, an assembler has a particular assembler type that may employ an associated namespace that may be used as a key to map the resource package compiled by the assembler.

In another example, a weaver service is configured to merge multiple resource packages generated by an assembler service during a compilation phase into the knowledge base. In one implementation, the weaver service is configured to allow incremental knowledge changes to be merged into the knowledge base. In yet another example, a runtime service is configured to implement logic associated with a particular knowledge type. In an implementation, the rules engine core may be kept minimal such that the assembler services and runtime services needed for implementation of a knowledge type may be plugged into the rule engine through a service registry, as described in greater detail below.

Accordingly, aspects of the present disclosure provide a de-coupled, pluggable architecture wherein different knowledge types can be easily discovered, added, compiled, and run while maintaining a minimal core kernel. Each available service corresponding to a knowledge type may communicate with the PRE via plugins corresponding to the pluggable services. As a result, storage resources and computing (processing) resources are significantly reduced.

FIG. 1A is an example system architecture 100 in which implementations of the disclosure can be implemented. The system architecture 100 can include a pluggable rule engine (PRE) 105. The PRE 105 can be implemented on one or more machines (e.g., server computers, desktop computers, etc.). In an implementation, the PRE 105 may be hosted by a computing device including one or more computer programs executed by one or more processing devices operatively coupled to one or more data stores (e.g., memory, hard disk, etc.). In one implementation, the PRE 105 may comprise various interfaces, including an administrative interface, a reporting interface, and/or application programming interfaces (APIs) to communicate with a services registry 140, user portals, databases, directory servers and various other components, which are omitted from FIGS. 1A-1B for clarity. The PRE 105 discovers, registers and manages multiple different knowledge types (or resource types) and related pluggable services. Example knowledge types include workflows, rules, Bayesian belief networks (BBN), and the like. Example services include assemblers, weavers, runtimes, and the like.

As illustrated in FIG. 1A, the PRE 105 includes a discovery mechanism 110 configured to discover available knowledge types and plugin the services related to those knowledge types. For example, FIG. 1A shows various different discoverable knowledge types (e.g., Knowledge Type 1 120A, Knowledge Type 2 120B, and Knowledge Type N 120N). Each knowledge type (i.e., 120A, 120B, 120N) may include a knowledge type configuration file (e.g., knowledge type 1 configuration file 122A, knowledge type 2 configuration file 122B, and knowledge type 1 configuration file 122N) stored in one or more data stores (e.g., one or more databases) accessible by the PRE 105 via one or more suitable APIs. The one or more data stores may be hosted by one or more data storage devices that can include block-based storage devices, file-based storage devices, or a combination thereof.

In an implementation, the knowledge type configuration file may be referred to as a "knowledge.conf" file and stored in a folder (e.g., a special META-INF folder). It is noted that the nomenclature "knowledge.conf" is intended to represent an example file name identifier for a configuration file and any alternative file name identifiers may be used in accordance with aspects of the present disclosure. A listing of the discovered knowledge.conf files may be identified by the discovery mechanism 110 as a list of URLs wherein each URL may be used to generate a map of identifying information associated with each knowledge.conf file stored in a service registry 140, as shown in FIG. 1A.

In an implementation, for each of the discovered knowledge types, one or more of the pluggable services 150 that are associated with implementation of the discovered knowledge type are registered by the service registry module 130. For example, if a first knowledge type is a BBN, a configuration file associated with the discovered services needed to implement the particular BBN is registered in a service registry 140 by a service registry module 130. Pluggable services 150 can be implemented on one or more machines (e.g., server computers, desktop computers, etc.). The service registry 140 may include one or more data structures (e.g., a database, a repository, etc.) and may be hosted by one or more data storage devices that can include block-based storage devices, file-based storage devices, or a combination thereof.

Continuing the example relating to services identified for a BBN knowledge type, the configuration files for the discovered services (e.g., an assembler service, a weaver service, and a runtime service) may be expressed as follows:

```
[
'assemblers' :
[ new org.drools.beliefs.bayes.assembler.BayesAssemblerService( )
],
'weavers' :
[ new org.drools.beliefs.bayes.weaver.BayesWeaverService( ) ],
'runtimes' :
[ new org.drools.beliefs.bayes.runtime.BayesRuntimeService( ) ]
]
```

According to implementations, the configuration files may model a Map<String, List> format, wherein a key associated with the each configuration file is represented by the "String" value identifying the service type (e.g., assembler, weaver, runtime) and the corresponding "List" represents a list of the pluggable implementations for the identified service type. FIGS. 2A-2E illustrate exemplary processes relating to the discovery and registration of knowledge types and services.

Figure 1B:
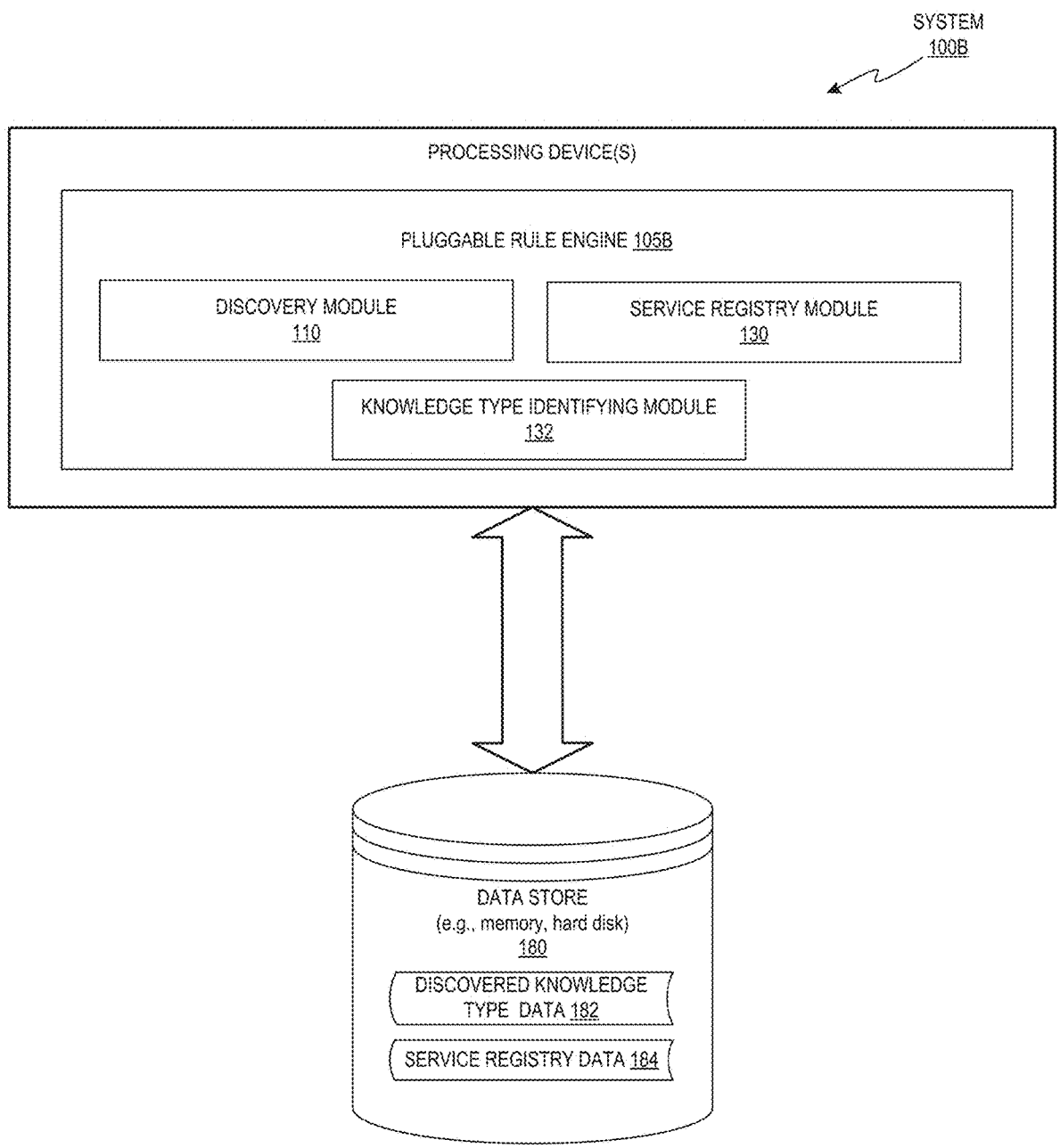
FIG. 1B depicts a block diagram of an example system operating in accordance with one or more aspects of the present disclosure.

FIG. 1B is a block diagram illustrating example components and modules of system 100B, in accordance with one or more aspects of the present disclosure. System 100B may be the same or similar to system 100 of FIG. 1A and may include a data store 180 and one or more processing devices configured to execute a pluggable rule engine 105B. Pluggable rule engine 105B may include a discovery module 110, a service registry module 130, and a knowledge type identifying module 132. The components of system 100B are discussed in more detail below in conjunction with FIG. 2A.

Figure 2A:
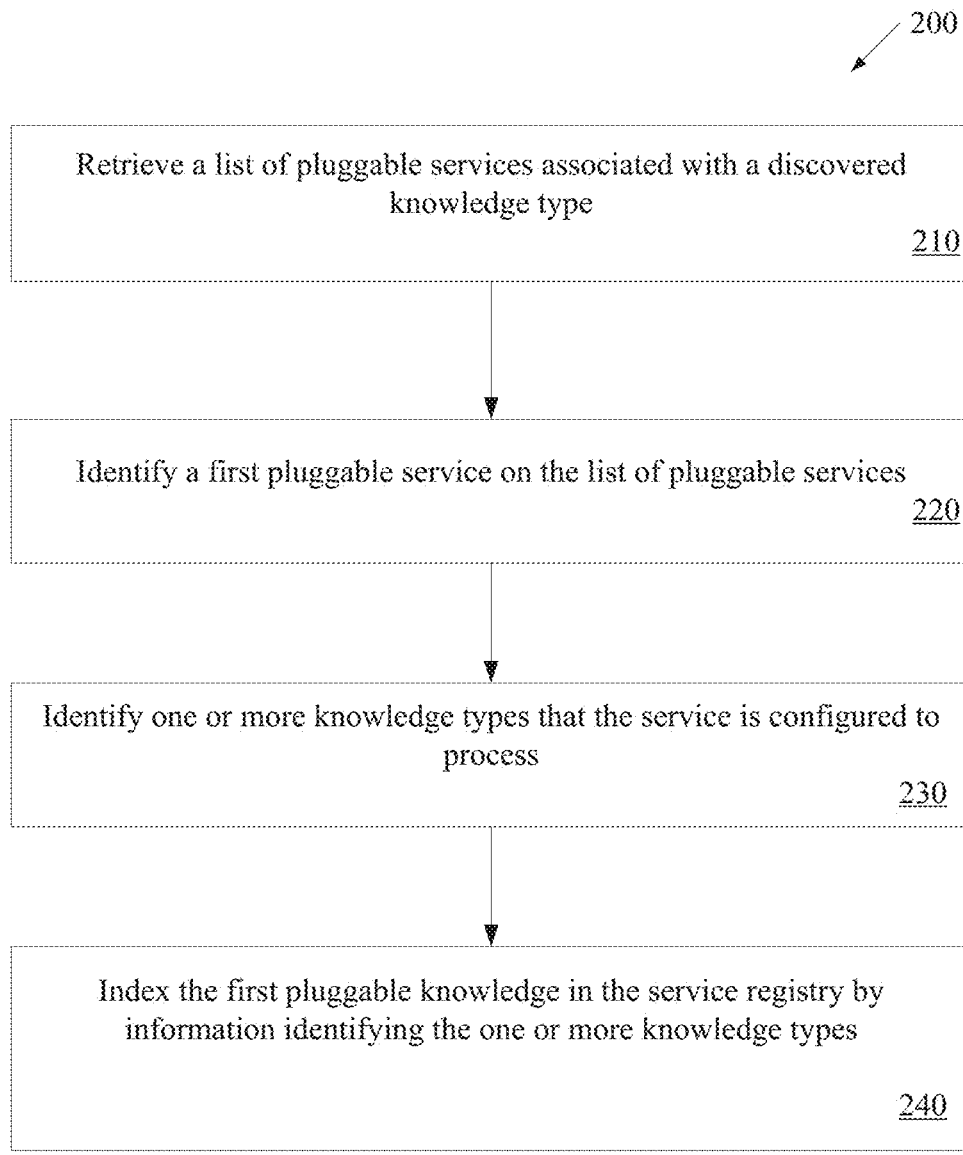
FIGS. 2A-2G depict flow diagrams relating to example methods for registering pluggable services with a service registry, in accordance with one or more aspects of the disclosure.

FIG. 2A depicts a flow diagram for an illustrative example of method 200 for a service registration process. Method 200 includes registering a discovered service with the service registry (e.g., service registry 140 of FIG. 1) with the PRE. Method 200 may be performed by one or more processing devices that may comprise hardware (e.g., circuitry, dedicated logic), computer readable instructions (e.g., run on a general purpose computer system or a dedicated machine), or a combination of both. Method 200 each of the described individual functions, routines, subroutines, or operations may be performed by one or more processors of the computer device executing the method. In certain implementations, method 200 may be performed by a single processing thread. Alternatively, method 200 may be performed by two or more processing threads, wherein each thread executes one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing devices implementing the PRE 105, and specifically the discovery module 110, the service registry module 130, and compiler 135, as shown in FIGS. 1A and 1B.

In block 210, a processing device retrieves, from a configuration map associated with a certain knowledge type, a list of pluggable services associated with the knowledge type. The file associated with the knowledge type may be identified by discovery function executed by discovery module 110 of FIG. 1B. In an implementation, the discovery module 110 of FIG. 1B may be configured to execute the discovery function to identify the one or more discoverable knowledge type files that include a configuration map. The discovery function may be executed according to a schedule, in response to a request or command from a user, or according to any suitable triggering action that causes the initiation of the discovery function.

In an implementation, the list of pluggable services is identified from the configuration map included in a file associated with a knowledge type. The knowledge type may be identified by an extension associated with the corresponding file (e.g., the configuration map provides information identifying the one or more pluggable services associated with implementation of the knowledge type. In an implementation, each pluggable service is represented by a knowledge.config file stored in data store 180 of FIG. 1B. For example, the knowledge.config file may contain information that identifies may be analyzed to determine the one or more services associated with the knowledge type. The discovered knowledge type data 182 including the knowledge type identifying information and configuration map may be stored in data store 180 of FIG. 1B.

Figure 2B:
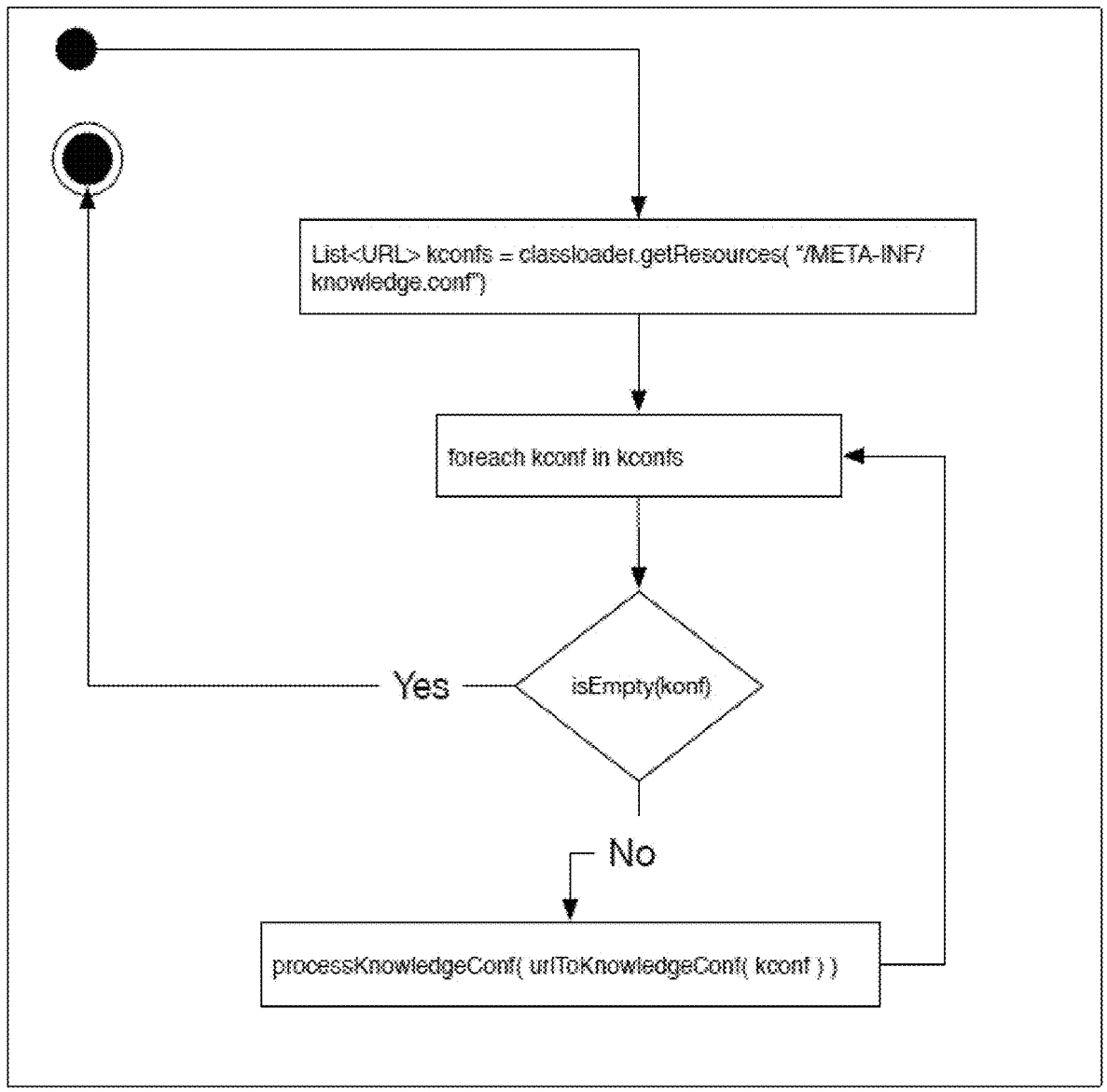
Figure 2C:
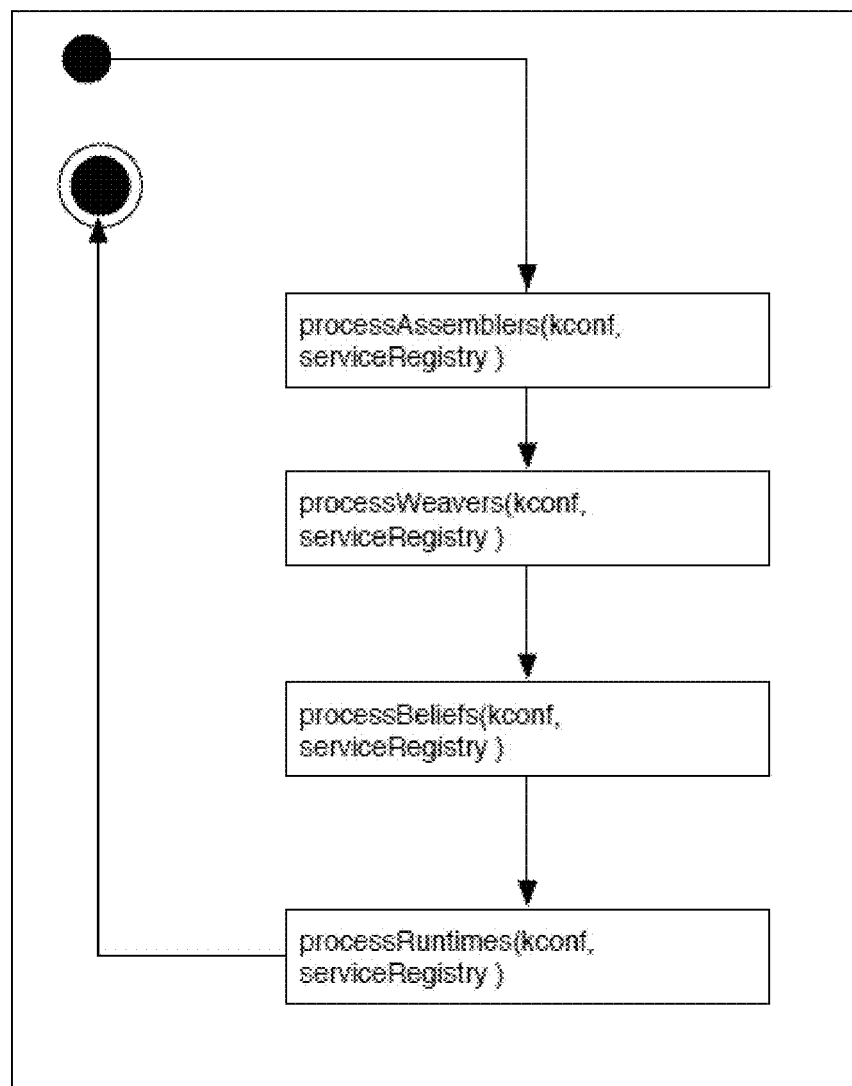

Following the knowledge type identification, a portion of a service registry used to store the particular type of service is selected. In an implementation, the service registry portion may be selected by service registry module 130 of FIG. 1B. For example, if a first assembler service is identified from the configuration file, then a portion of the service registry configured to store the assembler services is selected to enable the grouping of like services (e.g., assembler services, weaver services, runtime services) in a common area to increase efficiency during a subsequent lookup or review of the service registry during a service identification stage of the process, as described in greater detail below. Operations for processing a list of service files, referenced by block 210, may be iteratively performed for each of the services of a given type that are identified on the list. Service registry data 184 including the information identifying the service (e.g., type of service, associated knowledge type, etc.) may be stored in data store 180 of FIG. 1B. FIGS. 2B-2C illustrate an exemplary process for iteratively processing a list of service files (e.g., knowledge.config files) to discover the pluggable services associated with a knowledge type. In an example, as shown in FIG. 2C, one or more assembler services, weaver services and runtime services relating to a particular knowledge type (e.g., a BBN knowledge type) are identified for adding to the service registry associated with the rules engine. FIG. 2B illustrates an iterative process for identifying discovered knowledge type data 182 (e.g., one or more knowledge.config files). The discovered knowledge type data may then be processed to identify the one or more services associated with the discovered knowledge type and stored as service registry data 184 in data store 180, as shown in FIG. 2C.

With reference to FIG. 2A, in block 220, the processing device selects a pluggable service from the list of pluggable services. In block 230, the processing device identifies one or more knowledge types (also referred to as a "resource knowledge type") or file types that the identified service can process. In block 240, identified service is registered on the service registry and indexed using a key identifying the one or more knowledge types and file types that the service is configured to process. In an implementation, the identified service is registered in a selected portion of the service registry, as identified in block 210. In an implementation, operations of block 220-230 may iteratively be performed for two or more services selected from the list of pluggable services.

Figure 2D:
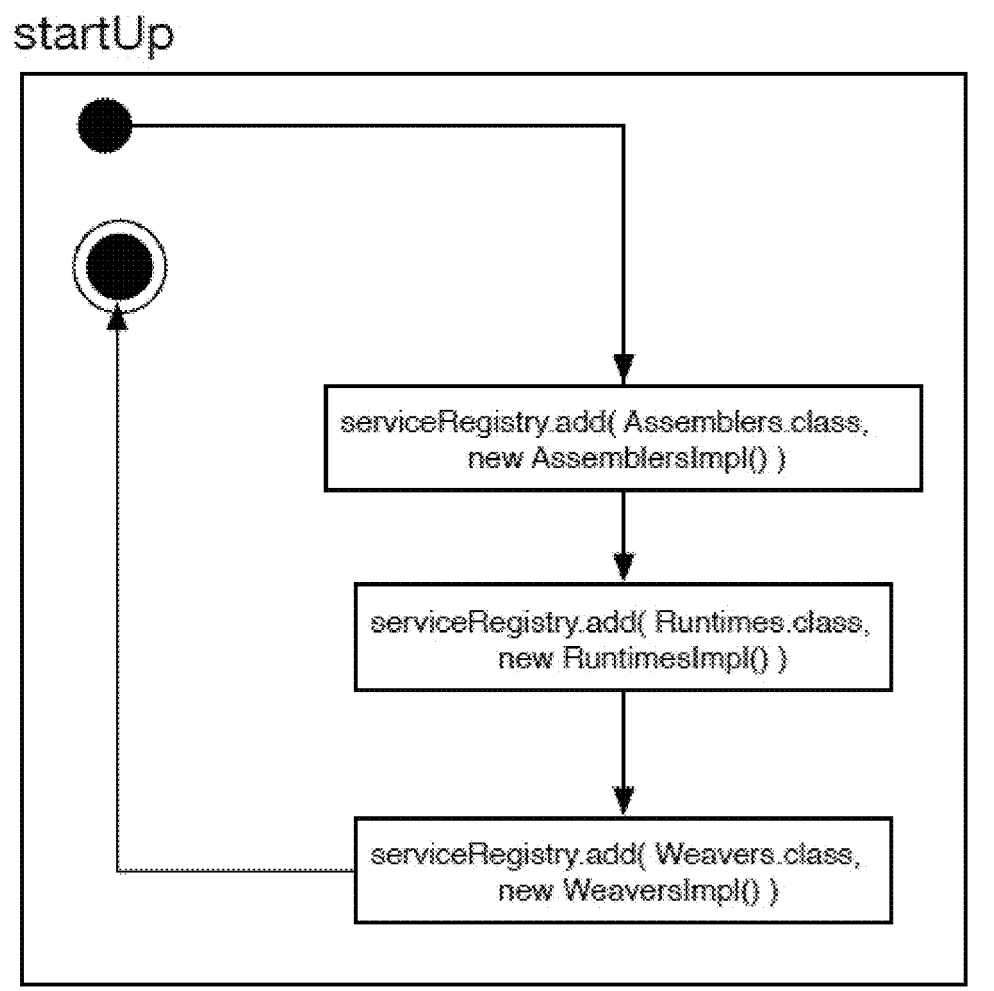
Figure 2E:
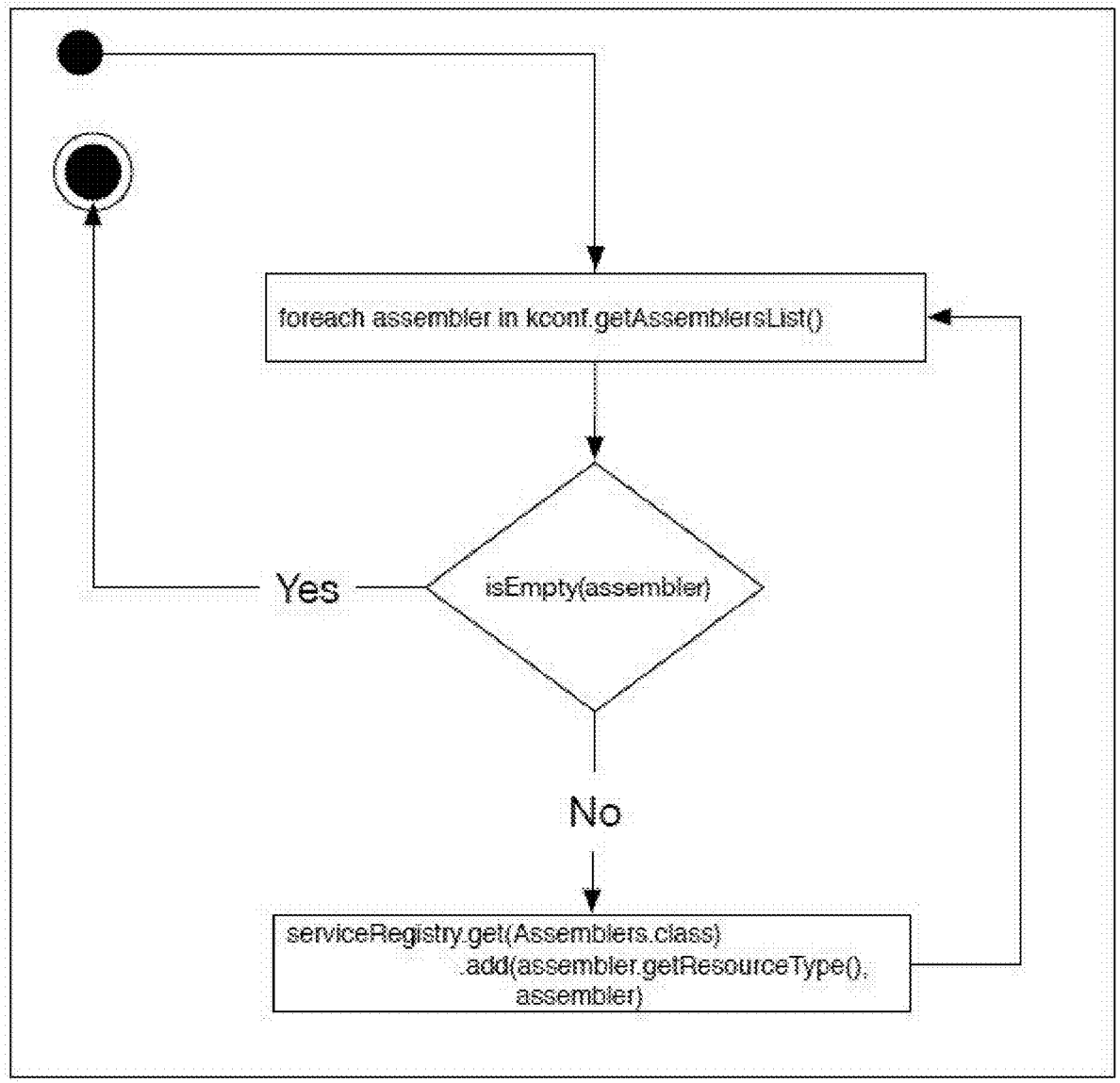
Figure 2F:
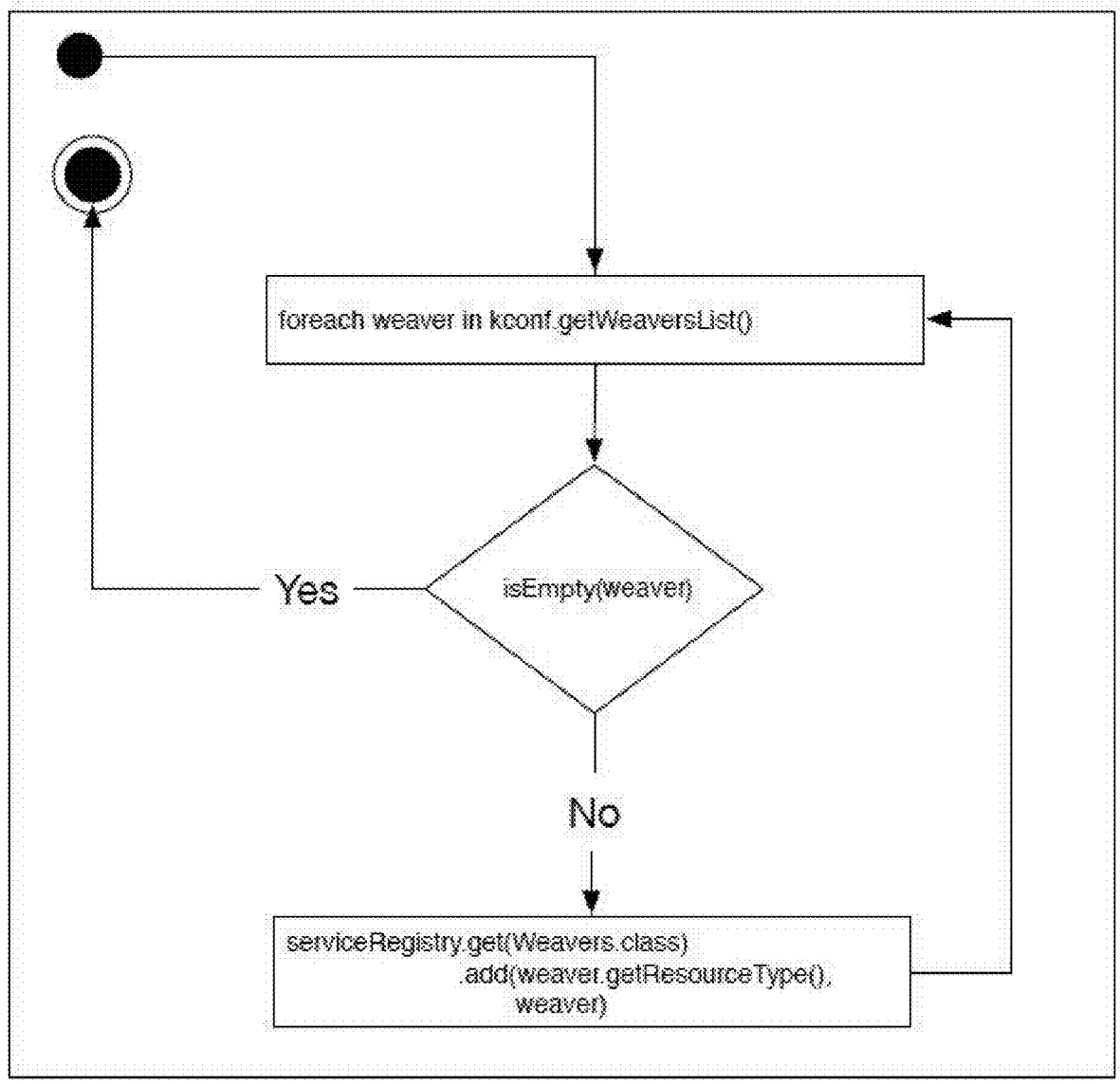

FIG. 2D illustrates an example process for registering identified services (e.g., assembler services, runtime services, and weaver services) with the services registry. FIGS. 2E and 2F illustrate example processes for registering assembler services and weaver services, respectively, according to implementations of the present disclosure. As shown FIG. 2E, a list of assemblers identified from a configuration file (e.g., knowledge.conf files) associated with a knowledge type is iteratively processed to identify each assembler service to add to the services registry, until there are no further assemblers on the list. As shown FIG. 2F, a list of weavers identified from a configuration file (e.g., knowledge.conf files) associated with a knowledge type is iteratively processed to identify each weaver service to add to the services registry, until there are no further weavers on the list.

Figure 2G:
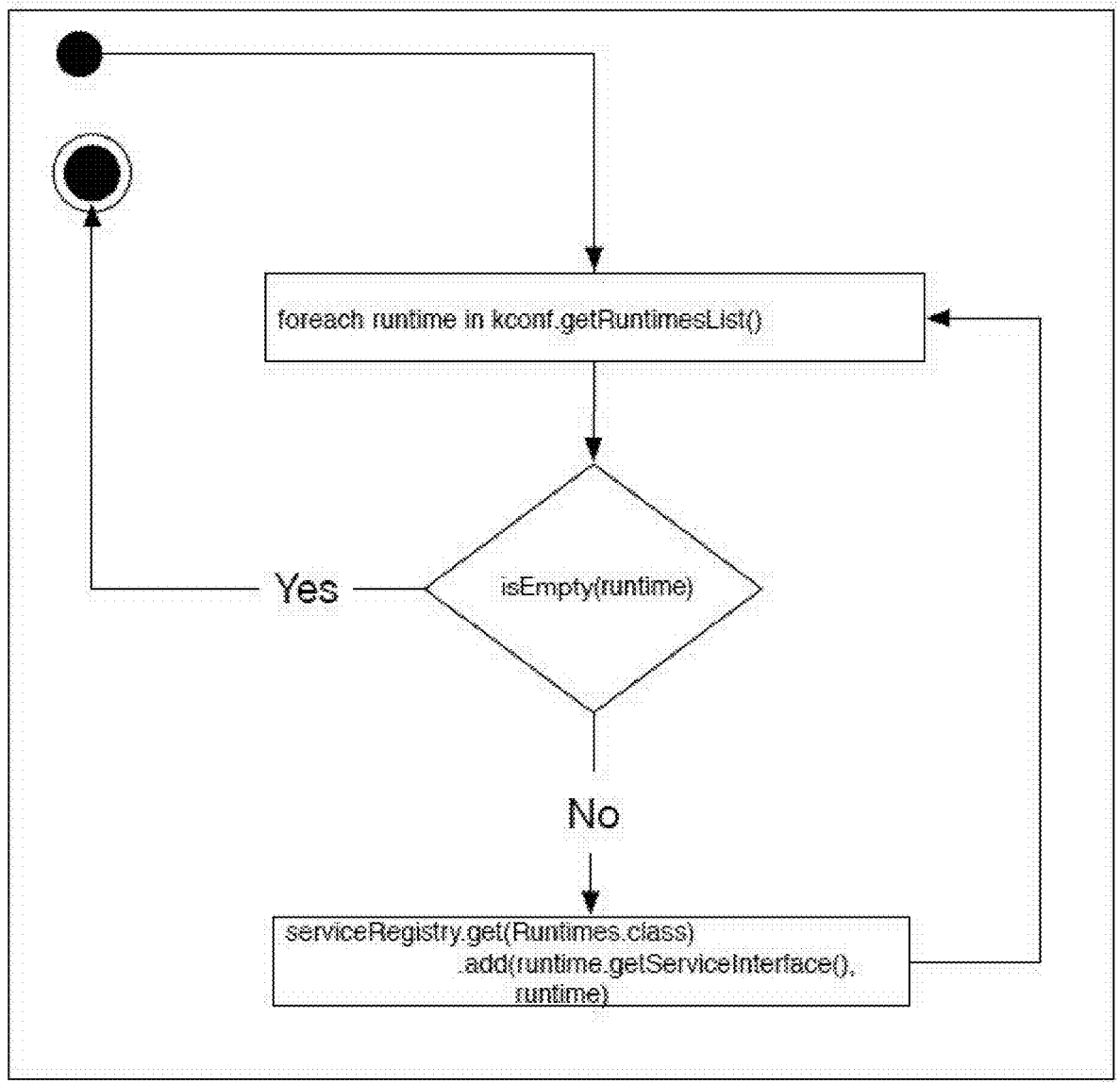

In an implementation, each service of the various different service types (e.g., assemblers, weavers, runtimes, etc.) may be registered with the service registry according to the process illustrated in FIGS. 2A-2G. In an implementation, a runtime service may be registered according to the processes described above in connection with FIG. 2G, wherein a key is used to index the runtime service in the services registry, such that the services registry is searchable using the key to identify an appropriate runtime service relating to a given knowledge type. The key used to classify a respective runtime service may be a runtime class that the runtime is configured to generate, as defined in a configuration file or metadata associated with the runtime service. As depicted in FIG. 2G, a list of runtimes identified from a configuration file (e.g., knowledge.conf) associated with a knowledge type is iteratively processed to identify each runtime service to add to the services registry, until there are no further runtimes on the list.

In an illustrative example, when a new service is identified during the discovery and registration process (e.g., a Bayes Assembler Service), it is determined that the particular service implementation is configured to compile knowledge resources encoding a Bayesian belief system. Continuing this example, when a request to build a knowledge package from the knowledge resource (e.g., the Bayes belief system) is identified, a compiler of the rules engine (e.g., compiler 135 of FIG. 1A) may delegate, through the services registry, the compilation task to the appropriate assembler service (e.g., the Bayes Assembler Service), as described in greater detail below with reference to FIG. 3A.

In an implementation, the discovery module 110 and service registry module 130 of the pluggable rules engine (e.g., discovery mechanism 110 and service registry manager 130 of PRE 105 in FIG. 1A) discover and register the services associated with each of the various different knowledge resources. Accordingly, a specific implementation of a compiler or each specific knowledge type and corresponding runtime does not need to be embedded into a core of the PRE 105, thereby enabling the kernel of the PRE 105 to be minimized. In an implementation, any of the multiple pluggable services (e.g., services 150 in FIG. 1A) that are registered with the service registry (e.g., service registry 140 of FIG. 1A) may be plugged in to the PRE 105 through the services registry 140. Accordingly, in an example implementation, a core compiler 135 of the PRE 105 includes minimal logic configured to check (e.g., perform a look up) the service registry to determine if the service registry includes an assembler defined for the type of resource to be compiled and delegate the production of a corresponding knowledge package to the identified assembler, as described below with reference to FIGS. 3A-3B.

Figure 3A:
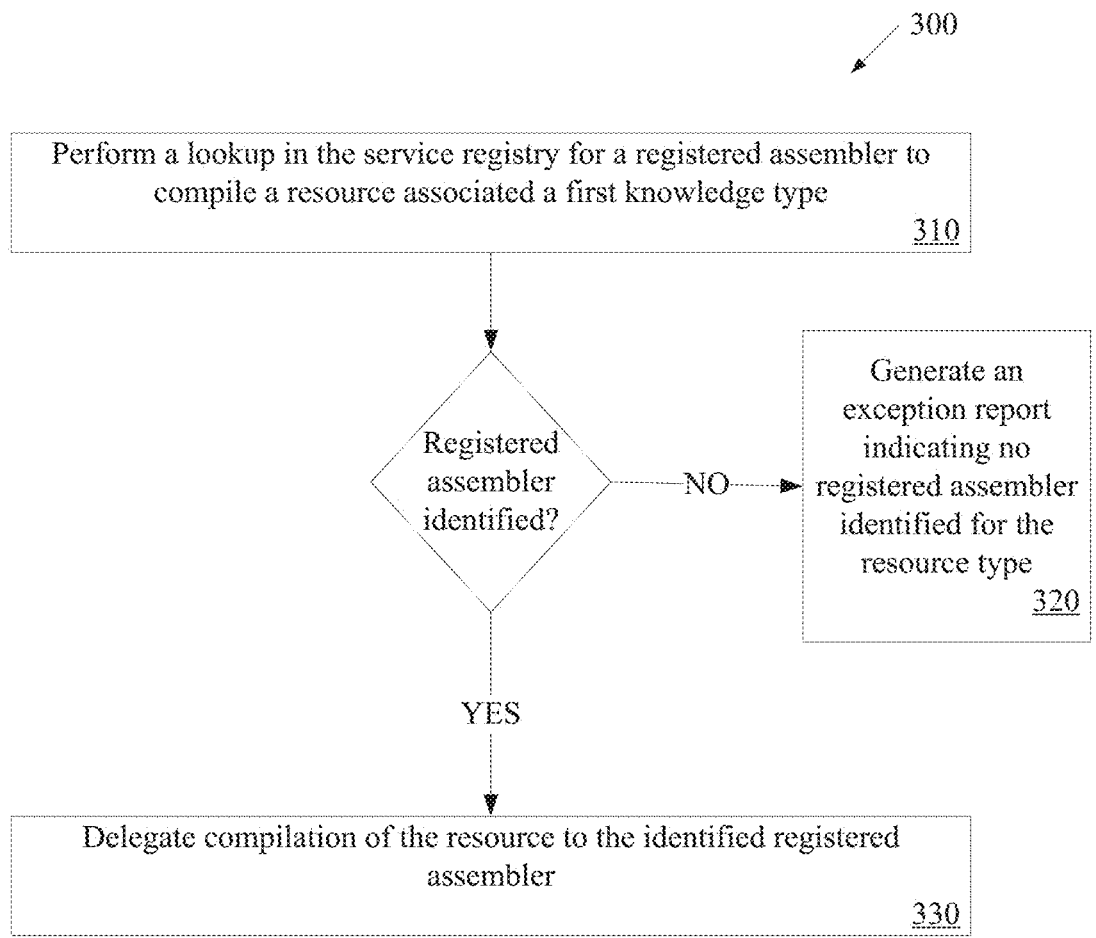
FIGS. 3A-3B depict flow diagrams relating to example methods for delegating compilation of a resource to a pluggable assembler service, in accordance with one or more aspects of the disclosure.

FIG. 3A depicts a flow diagram for an illustrative example of method 300 for a compilation delegation process, according to implementations of the present disclosure. In an implementation, method 300 may be performed following the discovery and registration of the services, as described in connection with FIG. 2A. For example, having discovered and registered various assembler services and corresponding knowledge types that the assembler services are configured to process, method 300 may be employed to perform compilation services using a pluggable assembler service identified in the services registry.

Method 300 includes compiling custom knowledge types with assembler services registered with a service registry (e.g., service registry 140 of FIG. 1A) associated with the PRE 105. Method 300 may be performed by one or more processing devices that may comprise hardware (e.g., circuitry, dedicated logic), computer readable instructions (e.g., run on a general purpose computer system or a dedicated machine), or a combination of both. Method 300 each of the described individual functions, routines, subroutines, or operations may be performed by one or more processors of the computer device executing the method. In certain implementations, method 300 may be performed by a single processing thread. Alternatively, method 300 may be performed by two or more processing threads, wherein each thread executes one or more individual functions, routines, subroutines, or operations of the method.

In block 310, a core compiler 135 of the PRE 105 initiates a lookup in the service registry 140 for a registered assembler service to compile a resource associated with a particular knowledge type (e.g., a first knowledge type). In an implementation, the PRE 105 may initiate the lookup following receipt of a request to compile the particular knowledge type (e.g., in response to a command from a user or computer program to compile a knowledge type). In an implementation, the core compiler 135 may facilitate the retrieval of the registered assembler service via a service registry module (e.g., service registry module 130). If an assembler service configured to compile the particular knowledge type is not identified in the service registry, the core compiler 135 may generate an exception report indicating that no registered assembler service was identified, in block 320. If a registered assembler service is identified in the services registry, the core compiler 135 delegates compilation of the resource to the identified registered assembler service, in block 330. In an implementation, as part of the delegation of the compilation, the identified assembler service communicates with the PRE via application programming interfaces (APIs) provided via a plugin installed in the PRE.

Figure 3B:
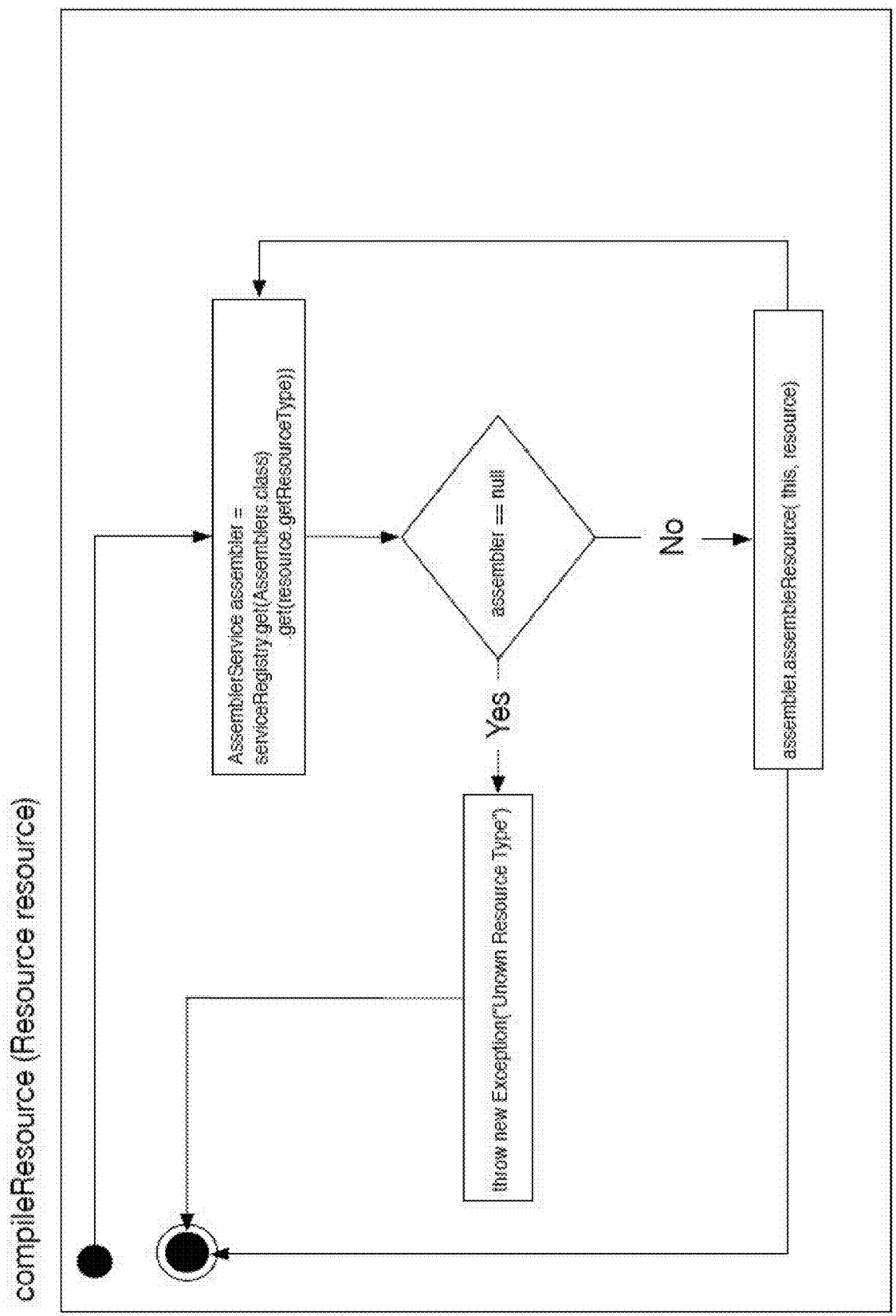

FIG. 3B illustrates an example implementation of blocks 310-330 of FIG. 3A, which, for example, may be represented by the following:

```
void compileResource(Resource resource) {
  AssemblerService assembler =
    ServiceRegistry.get(
    Assemblers.class).get(resource.getResourceType( ));
  if (assembler != null) {
    assembler.assembleResource( this, resource );
  } else {
    throw new RuntimeException(
      "Unknown knowledge type: " + resource.getResourceType( ));
```

According to implementations of the present disclosure, the resource packages generated as a result of the compilation process executed by each of the multiple assembler services may not be compatible with one another. In view of this incompatibility, the present disclosure provides a process to include resource packages based on different knowledge types to be included in a same knowledge package. To achieve this flexibility, the resource packages generated by the assembler services are configured to store different types of knowledge indexed by the knowledge type from which the resource package is generated.

In an implementation, the resource package contains an identifier represented by an expression such as Map<ResourceType, ResourcePackage, such that the resource packages resulting from the compilation of the custom knowledge types are stored. Advantageously, a same or single resource package may contain or carry a product of the compilation of resources of different types.

Figure 4:
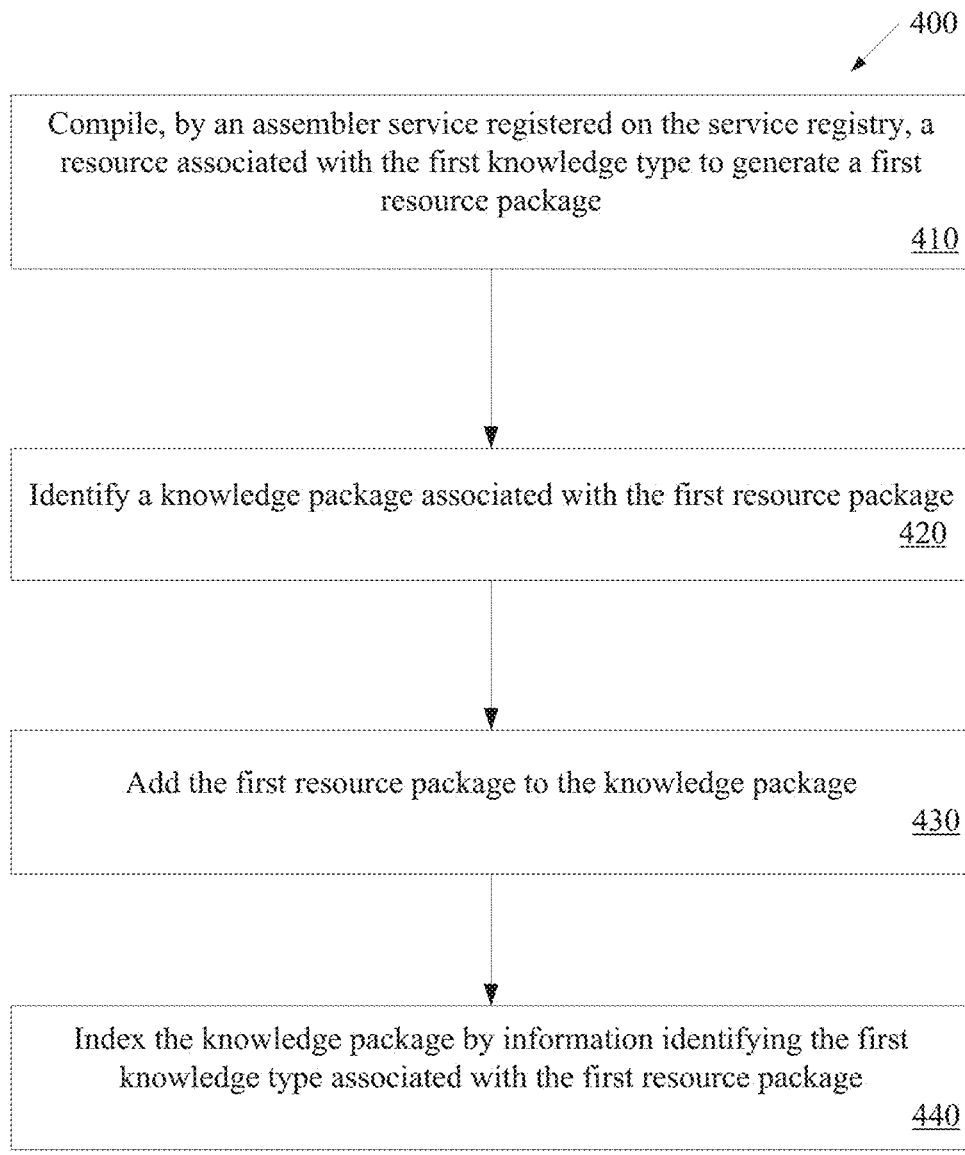
FIG. 4 depicts a flow diagram of an example method for adding a resource package to a knowledge package, in accordance with one or more aspects of the disclosure.

FIG. 4 depicts a flow diagram for an illustrative example of method 400 for adding a resource package built by a custom compilation process by an assembler service to another knowledge package having a same knowledge type, according to implementations of the present disclosure. In an implementation, method 400 may be performed following the compilation of a knowledge package to enable multiple custom knowledge packages to be combined with a like knowledge package.

Method 400 includes compiling custom knowledge types with assembler services registered with a service registry (e.g., Service Registry 140 of FIG. 1A) associated with the PRE 105 and adding the custom resource packages to other knowledge packages. Method 400 may be performed by one or more processing devices that may comprise hardware (e.g., circuitry, dedicated logic), computer readable instructions (e.g., run on a general purpose computer system or a dedicated machine), or a combination of both. Method 400 each of the described individual functions, routines, subroutines, or operations may be performed by one or more processors of the computer device executing the method. In certain implementations, method 400 may be performed by a single processing thread. Alternatively, method 400 may be performed by two or more processing threads, wherein each thread executes one or more individual functions, routines, subroutines, or operations of the method.

Referring to FIG. 4, in block 410, an assembler service (e.g., an assembler service of the services 150 of FIG. 1A) encoded with a custom compilation process builds or compiles a resource package for a resource having a knowledge type (e.g., a first knowledge type). In an implementation, the compilation may be performed responsive to receiving a command line request. In block 420, a knowledge package indexed with information identifying a same name as the newly created resource package is identified. In an implementation, the knowledge package having a same name as the resource package may be identified by retrieving the knowledge package from a knowledge builder component (i.e., the KnowledgeBuilder 137 of FIG. 1). In an implementation, the KnowledgeBuilder 137 is responsible for taking source files (e.g., .drl files, .bpmn2 files, or .xls files), and turning them into a KnowledgePackage of rule and process definitions which a knowledge base can consume. In an implementation, if a knowledge package having the same name as the resource package is not identified, a knowledge package is created with the same name.

In block 430, the new resource package is added to the knowledge package (i.e., either the identified knowledge package or the newly created knowledge package). To this end, the knowledge package may include multiple different resource packages that were generated by the custom compilation processes encoded in multiple different assembler services. In block 440, the knowledge package is indexed by the knowledge type associated with the resource package.

In an example, the process detailed above with reference to FIG. 4 may be represented as follows:

```
void assembleResource(KnowledgeBuilder builder, Resource resource) {
    ResourcePackage resourcePackage = build(resource);
    KnowledgePackage package =
        builder.getOrCreatePackage(resourcePackage.getPackageName( ));
    package.put(resource.getResourceType( ), resourcePackage);]
}
```

According to implementations of the present disclosure, after the resource packages are compiled into the corresponding knowledge packages, to execute or run the particular capabilities encoded in the new knowledge type, a specific runtime service may be needed. As described above, during the registration process, the available runtime services have been discovered and registered in the services registry (i.e., Service Registry 140 of FIG. 1). Using the Service Registry Module 130 and the Service Registry 140, an instance of a particular runtime may be obtained from the core of the PRE 105. For example, in the case of the Bayesian belief system example discussed above, a specific runtime service (referred to as a "BayesRuntime") can be obtained from the PRE's core knowledge runtime. In this example, the BayesRuntime may be obtained according to the following expression:

BayesRuntime
bayesRuntime=coreRuntime.createRuntime
(BayesRuntime.class)

In an implementation, the service registry may already have discovered the runtime service is the appropriate service that has to be invoked when a new BayesRuntime is requested. In this instance, in order to implement a method to create a runtime (i.e., a createRuntime method) and instance the alternative custom runtime, the core knowledge runtime retrieves, through the service registry, the service that is capable of creating the specific runtime and delegate the runtime creation to a factory method of that service.

Continuing the example above, the service registry may be informed that the runtime service (i.e., the BayseRuntime) has the capability of creating runtimes of the identified class (i.e., the BayesRuntime class), as represented by the following expression:

```
public class BayesRuntimeService implements
    RuntimeService<BayesRuntime> {
    @Override
    public Class getServiceInterface( ) {
        return BayesRuntime.class;
```

In an implementation, a factory method may create the requested runtime according to the following expression:

```
@Override
public BayesRuntime newRuntime(KnowledgeRuntime runtime) {
    return new BayesRuntime( runtime );
}
```

Figure 5:
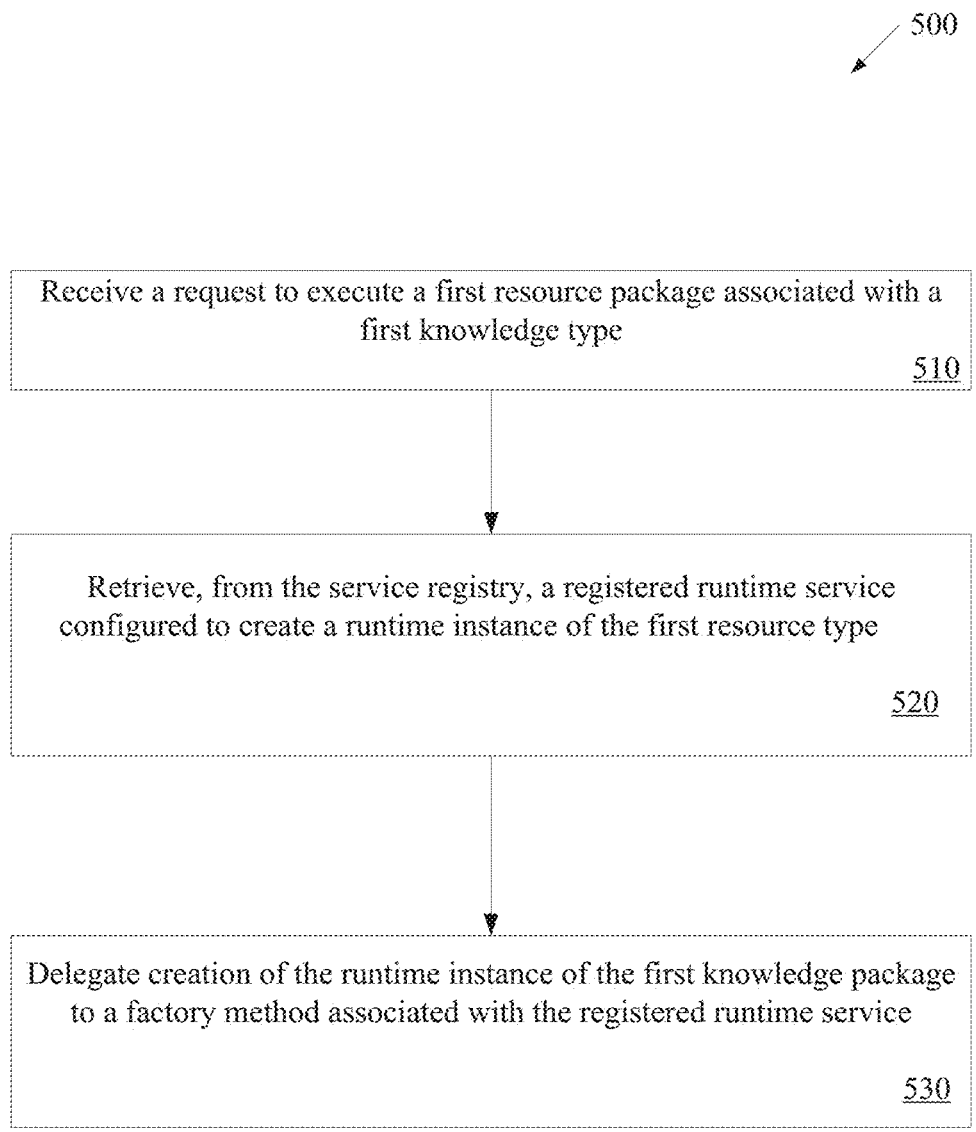
FIG. 5 depicts a flow diagram of an example method for delegating creation of a runtime instance to a pluggable runtime service, in accordance with one or more aspects of the disclosure.

FIG. 5 depicts a flow diagram for an illustrative example of method 500 for identifying a specific knowledge runtime service to run a knowledge package including one or more custom resource packages, according to implementations of the present disclosure. Method 500 includes looking up a specific runtime service in a service registry (e.g., Service Registry 140 of FIG. 1) associated with the PRE 105 that is configured to create a requested runtime and invoking a factory method of the identified runtime service. Method 500 may be performed by one or more processing devices that may comprise hardware (e.g., circuitry, dedicated logic), computer readable instructions (e.g., run on a general purpose computer system or a dedicated machine), or a combination of both. Method 500 each of the described individual functions, routines, subroutines, or operations may be performed by one or more processors of the computer device executing the method. In certain implementations, method 500 may be performed by a single processing thread. Alternatively, method 500 may be performed by two or more processing threads, wherein each thread executes one or more individual functions, routines, subroutines, or operations of the method.

In block 510, a request to run or execute a knowledge package (i.e., a first knowledge associated with a knowledge type (i.e., a first knowledge type) is received (e.g., from a user or based on one or more commands received from the user). In block 520, a core knowledge runtime of the PRE 105 initiates a lookup in the service registry for a registered runtime service configured to create the requested runtime of the first knowledge type. In an implementation, a core knowledge runtime of the PRE 105 may use the Service Registry Module 130 to perform the lookup in the services registry.

In block 530, having identified the appropriate runtime service to process the first knowledge package, the core knowledge runtime invokes a factory method of the identified runtime service by passing itself (i.e., the core knowledge runtime) to the identified runtime service. Accordingly, in block 530, the core knowledge runtime delegates the creation of a runtime instance (i.e., an occurrence of an object existing during runtime) for the knowledge package to the factory method of the identified (registered) runtime service. In an implementation, during the delegation of the runtime, the identified runtime service communicates with the PRE via one or more APIs provided via a plugin installed in the PRE.

In an implementation, blocks 510-530 of FIG. 5 may be implemented according to the following expressions:

```
<T> T createRuntimeService(Class<T> cls) {
  RuntimeService service =
      (RuntimeService<T>) ServiceRegistry.getRuntimes( ).get(cls);
  return service.newRuntime(this);
}
```

Figure 6:
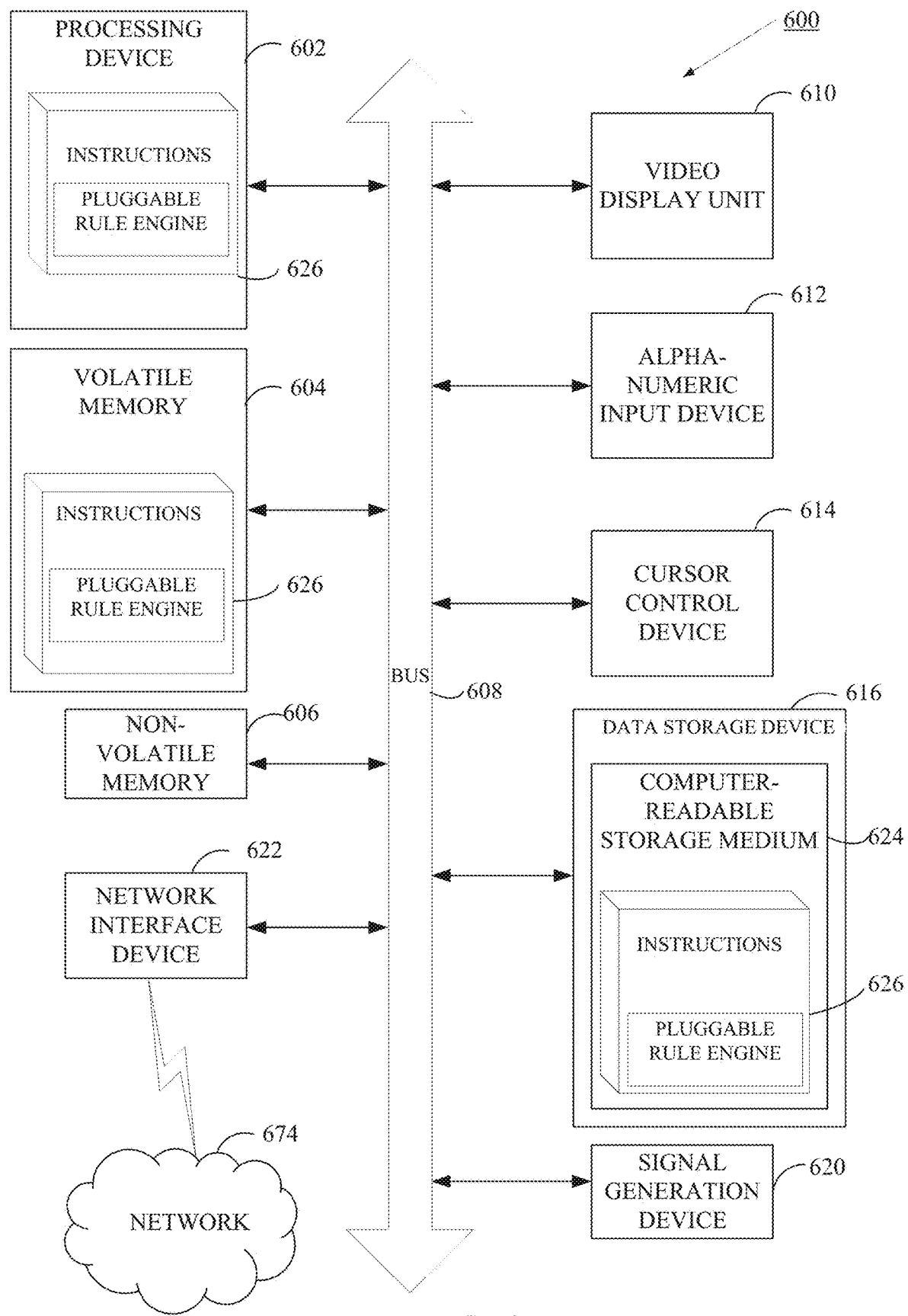
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a computing device within system architecture 100 and PRE 105 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions 626 for a the one or more components of PRE 105 of FIG. 1 for implementing methods described above with reference to FIGS. 2-5.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "discovering," "identifying," "registering," "processing," "performing," "delegating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, 400, and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
   retrieving, by a processing device executing a rule engine, a list of pluggable services associated with implementing a specified knowledge type;
   searching one or more data stores to identify a configuration file associated with a first pluggable service on the list of pluggable services;
   identifying, in view of the configuration file, one or more knowledge types that the first pluggable service is configured to implement, wherein the one or more knowledge types comprise the specified knowledge type; and
   indexing, by the processing device, an association between the first pluggable service and the specified knowledge type in a service registry, wherein the service registry comprises information identifying the one or more knowledge types that the first pluggable service implements.

2. The method of claim 1,
   wherein the first pluggable service communicates with the rule engine via an application programming interface provided via a plugin installed in the rule engine.

3. The method of claim 1, wherein the list of pluggable services is identified in view of a configuration file associated with the specified knowledge type.

4. The method of claim 1, wherein the first pluggable service comprises an assembler service.

5. The method of claim 4, further comprising:
   processing, by the processing device, an instruction to compile a resource associated with a knowledge type of the one or more knowledge types;
   performing, by the processing device, a lookup in the service registry in view of the information identifying the knowledge type to identify the assembler service; and
   delegating, by the processing device, compilation of the resource to the assembler service.

6. The method of claim 5, further comprising:
   compiling, by the assembler service, the resource associated with the knowledge type to generate a resource package.

7. The method of claim 6, further comprising:
   identifying a knowledge package associated with the resource package;
   adding the resource package to the knowledge package; and
   indexing, in the service registry, the knowledge package by the information identifying the knowledge type.

8. The method of claim 7, further comprising:
   retrieving, from the service registry, a registered runtime service configured to create a runtime instance of the knowledge package; and
   delegating creation of the runtime instance of the knowledge package to a factory method associated with the registered runtime service.

9. A system comprising:
   a memory; and
   a processing device operatively coupled to the memory, the processing device to:
     retrieve by a processing device executing a rule engine, a list of a pluggable services associated with implementing a specified knowledge type;
     search one or more data stores to identify a configuration file associated with a first pluggable service on the list of pluggable services;
     identify, in view of the configuration file, one or more knowledge types that the first pluggable service is configured to implement, wherein the one or more knowledge types comprise the specified knowledge type; and
     index, by the processing device, an association between the first pluggable service and the specified knowledge type in a service registry, wherein the service registry comprises information identifying the one or more knowledge types that the first pluggable service implements.

10. The system of claim 9, wherein the first pluggable service communicates with the rule engine via an application programming interface provided via a plugin installed in the rule engine.

11. The system of claim 9, wherein the first pluggable service comprises an assembler service.

12. The system of claim 11, wherein the processing device is further to:
    process an instruction to compile a resource associated with a knowledge type of the one or more knowledge types;
    perform a lookup in the service registry in view of the information identifying the knowledge type to identify the assembler service; and
    delegate compilation of the resource to the assembler service.

13. The system of claim 12, wherein the processing device is further to:
    compile, by the assembler service, the resource associated with the knowledge type to generate a resource package.

14. The system of claim 13, wherein the processing device is further to:
    identify a knowledge package associated with the resource package;
    add the resource package to the knowledge package; and
    index, in the service registry, the knowledge package by the information identifying the knowledge type.

15. The system of claim 14, wherein the processing device is further to:
    retrieve, from the service registry, a registered runtime service configured to create a runtime instance of the knowledge package; and
    delegate creation of the runtime instance of the knowledge package to a factory method associated with the registered runtime service.

16. A non-transitory machine-readable storage medium storing instructions that cause a processing device to:

retrieve by the processing device executing a rule engine, a list of a pluggable services associated with implementing a specified knowledge type;

search one or more data stores to identify a configuration file associated with a first pluggable service on the list of pluggable services;

identify, in view of the configuration file, one or more knowledge types that the first pluggable service is configured to implement, wherein the one or more knowledge types comprise the specified knowledge type; and index, by the processing device, an association between the first pluggable service and the specified knowledge type in a service registry, wherein the service registry comprises information identifying the one or more knowledge types that the first pluggable service implements.

17. The non-transitory machine-readable storage medium of claim 16, wherein the first pluggable service communicates with the rule engine via an application programming interface provided via a plugin installed in the rule engine.

18. The non-transitory machine-readable storage medium of claim 16, wherein the list of pluggable services is identified in view of a configuration file associated with the specified knowledge type.

19. The non-transitory machine-readable storage medium of claim 16, further comprising executable instructions causing the processing device to:

process an instruction to compile a resource associated with a knowledge type of the one or more knowledge types;

perform a lookup in the service registry in view of the information identifying the knowledge type to identify an assembler service; and delegate compilation of the resource to the assembler service.

20. The non-transitory machine-readable storage medium of claim 19, wherein the processing device is further to: compile, by the assembler service, the resource associated with the knowledge type to generate a resource package.

* * * * *